United States Patent
Markiewicz et al.

(10) Patent No.: US 12,174,049 B2
(45) Date of Patent: Dec. 24, 2024

(54) OPTICAL FIBRE BASED MEASUREMENT METHOD OF MEASURING PARAMETERS, AND COMPUTER PROGRAM PRODUCT

(71) Applicant: INPHOTECH SPOLKA Z OGRANICZONA ODPOWIEDZIALNOSCIA, Oltarzew (PL)

(72) Inventors: Krzystof Markiewicz, Warsaw (PL); Jakub Kaczorowski, Marki (PL); Lukasz Szostkiewcz, Torun (PL); Alejandro Dominguez-Lopez, Granada (ES); Marek Napierala, Warsaw (PL); Tomasz Nasilowski, Warsaw (PL)

(73) Assignee: Inphotech Spolka Z Ograniczona Odpowiedzialnoscia, Oltarzew (PL)

( * ) Notice: Subject to any disclaimer, the term of this patent is extended or adjusted under 35 U.S.C. 154(b) by 0 days.

(21) Appl. No.: 17/967,316

(22) Filed: Oct. 17, 2022

(65) Prior Publication Data
US 2023/0044386 A1   Feb. 9, 2023

Related U.S. Application Data

(63) Continuation of application No. PCT/EP2021/059917, filed on Apr. 16, 2021.

(51) Int. Cl.
*G01D 5/353* (2006.01)

(52) U.S. Cl.
CPC ..... *G01D 5/35361* (2013.01); *G01D 5/35306* (2013.01); *G01D 5/35354* (2013.01)

(58) Field of Classification Search
CPC ........... G01D 5/35361; G01D 5/35306; G01D 5/35354
See application file for complete search history.

(56) References Cited

U.S. PATENT DOCUMENTS

| 2004/0245441 | A1* | 12/2004 | Pieterse | G01D 5/35354 250/227.14 |
| 2007/0075225 | A1* | 4/2007 | Xia | G01N 21/7703 250/227.14 |
| 2010/0141930 | A1 | 6/2010 | Omichi et al. | |

FOREIGN PATENT DOCUMENTS

| JP | 2009053159 | 3/2009 |
| WO | 2014200986 | 12/2014 |
| WO | 2015170355 | 11/2015 |

OTHER PUBLICATIONS

International Search Report and Written Opinion from the European Patent Office, Authorized Officer Christopher Lyons, Jul. 6, 2021.
(Continued)

*Primary Examiner* — Jennifer D Bennett
(74) *Attorney, Agent, or Firm* — The Concept Law Group, PA; Scott D. Smiley; Scott M. Garrett

(57) ABSTRACT

Optical fibre based measurement system having a system for generating radiation (Z) with monotonically tuneable wavelength during sweep periods, an optical path (T) and a detector (D) connected to the system for generating radiation (Z) via the optical path (T). The optical path (T) comprises the interferometer (I) comprising the multi-port element (EW) and the attached measuring optical fibre (F) sensitive to at least two environmental parameters, the mode excitation system (P) adapted for excitation in the measuring optical fibre (F) of at least the measuring mode (Mn1) with the first effective refractive index and the measuring mode (Mn2) with the second effective refractive index, having different sensitivity to these two parameters. The measurement system comprises the processing unit (UP) to which the detector (D) is connected via the analogue-to-digital converter (ADC), and the processing unit (UP) is adapted to generate the control signal for the system for generating radiation (Z). The object of the invention is also the method
(Continued)

of measuring at least two parameters, and the computer program product.

12 Claims, 10 Drawing Sheets

(56) References Cited

OTHER PUBLICATIONS

Ding, Zhenyang et al. "Distributed Optical Fiber Sensors Based on Optical Frequency Domain Reflectometry: A review." Sensors (Basel, Switzerland) 18 (2018): 104-127.

* cited by examiner

OPTICAL FIBRE BASED MEASUREMENT METHOD OF MEASURING PARAMETERS, AND COMPUTER PROGRAM PRODUCT

CROSS-REFERENCE TO RELATED APPLICATION

This application is a bypass continuation of PCT/EP2021/059917, filed Apr. 16, 2021, and through that PCT application claims priority to EP 20461529.8, filed Apr. 17, 2020, the entireties of each of which are hereby incorporated by reference.

FIELD OF THE INVENTION

The present invention relates generally to optical fibre measurement systems, and, more particularly, relates to providing an optical fibre based measurement system, a method of measuring parameters, and a computer program product used for simultaneous measurement of at least one parameter representing a quantity, in particular those selected from the group of temperature, strain, radiation, and pressure.

BACKGROUND OF THE INVENTION

Although optical fibres are mostly used for telecommunication applications, their modal properties also allow them to be used as sensing components of sensors. Typically, changes in the effective refractive index are directly measured and used to determine the appropriate measurand-temperature, pressure, radiation, or mechanical strain of the optical fibre by strain, stress, vibration, magnetic induction, or the type of surrounding medium. All these quantities affect the effective refractive index, so measurements under non-stationary conditions, where more than one quantity influencing the refractive index changes, are hindered.

Optical Frequency Domain Reflectometry (OFDR) is used to determine the effective refractive index as a function of optical fibre length by analysing signals reflected or scattered along the optical fibre-Ding, Zhenyang et al. "Distributed Optical Fiber Sensors Based on Optical Frequency Domain Reflectometry: A review." Sensors (Basel, Switzerland) 18 (2018): 104-127.

The current state of the art includes numerous solutions for distributed parameter measurement using optical fibres based on signals that are scattered in the optical fibre. There are three physical phenomena which can be a source of such useful signals: Rayleigh scattering, Raman effect, and Brillouin effect. In addition, Fresnel reflection occurs at the boundaries of layers, which can also provide useful signals. An example of the utilization of Fresnel reflection is the use of optical fibres with Bragg grating.

Rayleigh scattering is the scattering of light under the influence of inhomogeneity of the medium in which light propagates. One disadvantage of techniques involving the utilization of this phenomenon is the lack of direct information about temperature changes in the studied environment.

Raman effect is utilized to measure temperature using the Stokes and anti-Stokes signal intensity difference analysis in the optical fibre length function. The light power analysis enables the determination of the absolute temperature, unfortunately with relatively small resolution—at the level of 1 m—in the optical fibre length function. Furthermore, the utilization of Raman effect to monitor temperature requires using very sensitive detectors or a great amount of averaging as this effect is relatively weak.

Exploitation of Brillouin effect to measure temperature involves analysing the frequency of propagation of the acoustic wave generated in the optical fibre excited by light with high intensity.

Typically, measurements based on Rayleigh scattering use a single optical fibre measuring mode. The presence of more modes makes it more difficult to determine the effective refractive index. The set of solutions of the wave equation for a given optical fibre structure is limited to a finite number of solutions, the so called eigenfunctions. Eigenfunctions correspond to eigenvalues-propagation constants which are directly proportional to effective refractive indices:

$$\beta = n_{eff} \cdot \frac{2\pi}{\lambda}$$

Therefore, field distributions that propagate in the optical fibre—the so called modes—can be distinguished by effective refractive indices.

In the most general case, modes propagating in multimode and multi-core optical fibres can be divided by: order (eigenfunction number), polarization understood as a point on a Poincare sphere, and the core number to which a given mode is related.

For optical fibres with perfect symmetry, no distinction is made between polarization modes because they have the same effective refractive index.

Due to the number of wave functions available in the wavelength operating range, a distinction is made between single-mode and multi-mode optical fibre types. Only LP01 modes can propagate in single-mode optical fibres. Multi-mode optical fibres can also propagate LP11 and possibly higher modes.

In a single-mode optical fibre with perfect geometry, the fundamental LP01 mode is degenerated and consists of two perpendicularly polarised modes. In an optical fibre with perfect geometry, polarised modes have the same effective refractive index and the same cut-off wavelength. Actual optical fibres do not have a perfect geometry (e.g. due to fluctuations in refractive index distribution or external disturbances), which is why polarization modes do not propagate with the same velocity. The measure of optical fibre birefringence is the difference in the effective refractive indices of polarization modes.

Optical fibres with a structure that forces the differentiation of effective refractive indices of polarization modes is called a polarization-maintaining optical fibre (e.g. PANDA or BOW-TIE optical fibres).

In multi-core optical fibres, each core can propagate LP01 modes with different polarization. If a multi-core optical fibre is also a multi-mode optical fibre, it means that the LP11 mode can propagate in at least one of its cores.

In the Japanese application JP2009053159 there is disclosed an optical fibre device for measuring temperature of components of a motor vehicle equipped with a measuring optical fibre susceptible to Raman effect, i.e. the response of the optical fibre to excitation by light having a wavelength which is different from the excitation wavelength and dependent on temperature. The measuring optical fibre according to JP2009053159 is laid next to vehicle's exergonic components.

From document US2010141930A1 a device and method of measuring physical quantities are known, for simultaneous measurement of temperature and strain. Optical Frequency Domain Reflectometry (OFDR) has been applied in a device containing a tuneable laser and a detector connected by an optical path comprising polarization-maintaining optical fibres, polarization-maintaining couplers, including an interferometer consisting of a coupler equipped with an arm containing a reference optical fibre and an arm with a measuring optical fibre, which is a birefringent polarization-maintaining optical fibre with Bragg grating inscribed at measurement points. The detector is a photodiode. The device is equipped with a controller controlling the operation of the source via an analogue-to-digital converter, to which a detector is connected. The system is equipped with an exciting element, introducing light into the system to two different polarization modes.

The solution according to US2010141930A1 requires a special technological procedure-inscription of Bragg gratings in the core of the optical fibre. Measuring capabilities are limited to sections of the measuring optical fibre equipped with Bragg gratings, but the use of these gratings allows the system to obtain a measurement signal so strong that its intensity is comparable to the reference signal from the arm terminated with a reflective element. Additionally, the use of Bragg gratings allows for measurement with simultaneous excitation of both polarization modes excited in the measuring optical fibre and simultaneous detection.

A disadvantage of the solution according to US2010141930A1 is the limited number of measurement points and the limited number of parameters that can be measured simultaneously. In some applications, not only strain and temperature have an impact on the propagation of measuring modes in the optical fibre, but also other environmental factors such as pressure and radiation. Therefore, a need exists to overcome the problems with the prior art as discussed above.

SUMMARY OF THE INVENTION

An objective of the invention is to solve the problems identified in the state of the art and to provide a solution that enables measurement using the entire length of the measuring optical fibre, scalable to a greater number of parameters to be measured and adapted to operate with various environmental exposures.

The optical fibre based measurement system according to the invention is equipped with a system for generating radiation with monotonically tuneable wavelength during sweep periods, an optical path and a detector connected to the system for generating radiation via the optical path. The optical path contains an interferometer comprising a multi-port element and an attached measuring optical fibre sensitive to at least two environmental parameters, a mode excitation system adapted to excite in the measuring optical fibre at least a measuring mode with a first effective refractive index and a measuring mode with a second effective refractive index, having different sensitivity to these two parameters. The measurement system contains a processing unit to which the detector is connected via an analogue to digital converter, and the processing unit is adapted to generate the control signal for the system for generating radiation. According to the invention, the wavelength tuning range of the system for generating radiation is greater than or equal to 0.2 nm. Such a range provides sufficient resolution and measurement range for simple applications. The wavelength tuning rate of the system for generating radiation is greater than 0.15 nm/s; it has been experimentally found that effective measurement of even relatively slowly variable parameters requires at least such a rate of sweeping; however, without the measurement of vibrations under the conditions of their occurrence, the measurement of the remaining parameters is burdened with unpredictable error. It is important that the wavelength of the radiation generated by the system for generating radiation to be tuned monotonically—then, even if the tuning is not linear, it can be corrected, and the measurement result can be assigned to a point in the measuring optical fibre. The output optical power of the system for generating radiation is greater than or equal to 10 mW. Working with such power range allows measurements to be made using measurement signals subject to Rayleigh scattering using available detectors. The detector has a bandwidth of at least 400 kHz and Noise Equivalent Power of less than 10 pW·Hz-0.5. With a higher noise level, the error increases, which is unfavourably propagated numerically in the equation system which determines the measured parameters The analogue to digital converter has at least 8 bits; lower number of bits leads to increase of quantization error, which unfavourably propagates numerically in the equation system which needs to be solved in order to determine the parameters under test. The measuring optical fibre is adapted to guide modes with different effective refractive indices being sensitive to said parameters in different ways The measuring optical fibre is provided e.g. terminated with an anti-reflection system ensuring reflection of less than or equal to 50 dB. A higher level of reflection from the end of the measuring optical fibre hinders the processing of weaker measuring signals scattered along its length and results in errors that are subject to unfavourable numerical propagation when the parameter being determined is determined under conditions of variability of more than one parameter. Measuring under these conditions would require a structural modification of the measuring optical fibre, such as for example the application of a Bragg grating.

Preferably, the multi-port element and the mode excitation system are enclosed in a separate housing. This protects the sensitive components of the measurement system, i.e. the system for generating radiation and the processing unit from the environment in which the measuring optical fibre is placed. This configuration not only allows to avoid failure or damage of these sensitive components when values of environmental parameters (vibrations, temperature) exceed the permissible range of operation of these sensitive components, but also allows the removal of an influence of said environmental parameters on the radiation generation system and detector and consequently improvement in the accuracy of a measurement, particularly when the correction of the non-linearity of tuning is applied with a use of an additional system.

Limited measurement range in measurements based on Optical Frequency Domain Reflectometry usually results not from the propagation loss of the optical fibre, but from the increase of the frequency of the measured signal together with the extension of the optical fibre. With high-resolution measurement systems, this may require electronic systems with large bandwidths up to the GHz range, which in effect are expensive or whose remaining parameters are worse. By separating the systems, it is possible to effectively reduce the frequency of the signal returning from a given location in the optical fibre. Such a solution allows placing the system components in stable environmental conditions without increasing the required system parameters. In addition, this solution reduces the length of the measuring optical fibre, which leads to a reduction of the occurring shot noise and consequently a higher signal-to-noise ratio.

Preferably, the mode excitation system has a control input connected to the processing unit and is adapted to sequentially excite measuring modes in the measuring optical fibre.

The measuring optical fibre preferably has at least two cores and is equipped at the end with a fan-in/fan-out component and a loop connecting the two cores. Such a configuration can use simpler mode excitation systems and avoid the need to switch them or control them for sequential excitation of measuring modes, or at least reduce the number of switching operations.

Alternatively, the system for generating radiation is connected to the optical path via the mode excitation system and the measurement system has a second detector. Both detectors are connected to optical path via polarization beam splitter. The measurement optical fibre is birefringent and has fast axis and slow axis aligned with polarization axes of polarization beam splitter and the other elements of the optical path maintain polarization while mode excitation system is configured so that light fed to the optical path and measuring optical fibre has polarization slanted with respect to slow axis and fast axis.

Preferably, the measurement system is equipped with a system for determining the non-linearity of tuning. The use of such a system makes it possible to compensate for the tuning non-linearity at the level of sample processing of recorded interference signals.

The multi-port element is preferably a circulator with isolation in the range from 40 dB to 86 dB. This results in a favourable ratio between the reference signal and the measurement signal, which translates into a reduction of measurement error.

The anti-reflection element preferably has a reflection coefficient lower than or equal to −60 dB, and even better, lower than or equal to −80 dB. This reduces error introduced by the signal reflected from the end of the measuring optical fibre.

A method of determining the parameter at the measurement point via an optical fibre based measurement system equipped with a measuring optical fibre, which, by means of Optical Frequency Domain Reflectometry, records and analyses an interference signal, being a result of the interference of the measurement signal with the reference signal, according to the invention, is characterized in that the measurement system is used, according to the invention, and the measurement signal is structure of the measuring optical fibre. The utilization of Rayleigh scattering allows measurement of parameter at any point of the measuring optical fibre. The system for generating radiation cyclically sweeps, at a rate of at least 0.15 nm/s, the predefined range of wavelengths being at least 0.2 nm wide. At least two measuring modes with different effective refractive indices and different sensitivity to environmental parameters, to which the measuring optical fibre is exposed, are excited in the measuring optical fibre. By using different measuring modes, measurement data is obtained allowing to formulate a system of equations from which more than one parameter to be measured can be determined in case in which more than one parameter is changed along the measuring optical fibre. During the frequency filtration step for each measuring mode, the interference signal is subjected to frequency filtration with at least one band pass filter matched to the position of the measurement point along the measuring optical fibre. Then, in the correlation analysis step, a measure of similarity is determined as a function of shift in the wavelength domain of the interference signal frequency filtration result with the result of subjecting the calibration signal to the same filter, and on the basis of the wavelength value corresponding to the maximum of correlation, the change of effective refractive index $$\Delta n_{\text{eff}_{i,j}}$$

is determined for each of the aforementioned measuring modes with different effective refractive indices, obtaining a system of equations from which the measured parameter is determined during the determination step. System of equations can be solved so that only one parameter is determined or used to determine all variable parameters.

Preferably, before frequency filtration, samples of the interference signal recorded using the detector and samples of the calibration signal are corrected with respect to the tuning non-linearity of the system for generating radiation.

At least three measuring modes with different effective refractive indices are preferably applied. This allows determining three parameters or reducing the error of determining fewer parameters.

Preferably, more measuring modes is used than parameters is being determined. Such a solution makes it possible to formulate an overdetermined system of equations and reduce measurement error.

Measuring modes are preferably excited by subsequently selecting them by switching the mode excitation system with a signal from the processing unit. This solution enables measurements to be carried out with a single detector and allows the full use of the maximum length of the measuring optical fibre.

Preferably, a multi-core measuring optical fibre is used with two cores connected by a loop, in which at least two measuring modes are excited simultaneously during one sweep. This means it is not necessary to switch measuring modes sequentially and still use one detector. However, the maximum length of the measuring optical fibre is shortened because the measurement signal passed through the loop returns and travels the length of the measuring optical fibre again. Therefore, the optical path of the signal is a multiple of the length of the measuring optical fibre; using two cores and one loop, it is double the length.

The object of the invention is also a computer program product adapted to be stored in the memory of the processing unit, which is characterised by the fact that it contains instructions causing the execution of the method according to the invention.

The computer program preferably stores the calibration data-samples of the interference signal obtained under controlled measurement conditions.

BRIEF DESCRIPTION OF THE DRAWINGS

The object of the invention is described below in the embodiments discussed in relation to the drawing in which.

DETAILED DESCRIPTION

Figure 1A:
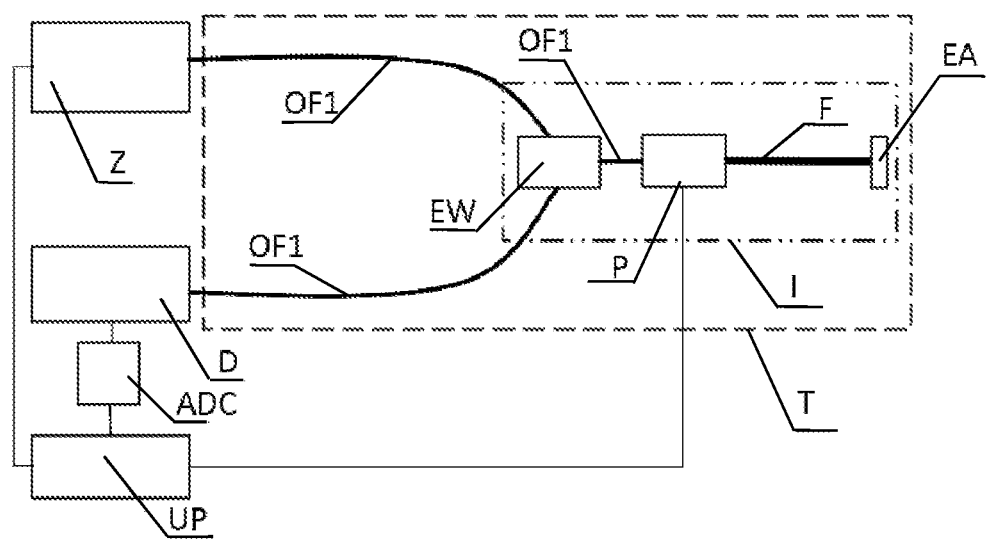
FIG. 1A shows a block diagram of the device in the embodiment of the invention.

In the embodiment of the invention shown in FIG. 1A, the optical fibre based measurement system according to the invention is equipped with a system for generating radiation Z having a monotonically tuneable wavelength. The system for generating radiation Z can be executed as a laser with wavelength λ tuned with control signal s, particularly current based, potentially equipped with an amplifier providing the required light power. The λ(s) dependence does not have to be linear, although it simplifies signal processing—it is enough that it is monotonical.

Lasers with an external resonant cavity provide a wavelength tuning range exceeding 0.2 nm and a tuning rate greater than 0.15 nm/s. They can also be combined with an amplifier providing an optical power of 10 mW. This solution is suitable for use as a source of radiation in the system for generating radiation Z according to the invention and enables measurements to be executed.

Better effects and the ability to record more rapidly changing parameters were achieved using current-tuned lasers with one resonant cavity, allowing reaching a tuning range of 1 nm with a rate of 8 nm/s at 40 mW of output power. Even better results were obtained using lasers with an external resonant cavity with tuning performed through a MEMS (micro-electromechanical system) component used as a controllable diffraction grating. This solution, combined with an optical fibre amplifier, allows achieving a tuning range above 5 nm with a tuning rate of 200 nm/s and an output power of 100 mW. This tuning rate even allows for the measurement of quite rapidly changing vibrations with high resolution and under simultaneous large range of temperature variability.

As a detector D, KOHERON PD100 photodiode system made of InGaAs gallium indium arsenide and a preamplifier with a 3.5 kV/W gain, 400 kHz band and Noise Equivalent Power (NEP) of 10 pW·Hz-0.5 were used. Better effects were obtained by using the THORLABS FPD510-FC-NIR system comprised of a photodiode and preamplifier with 216 kV/W gain, 1 MHz bandwidth and NEP of less than 2 pW/sqrt (Hz), and even better by using an avalanche photodiode with an amplifier with 2160 kV/W gain, 100 MHz bandwidth and noise equivalent power of less than 0.5 pW/sqrt (Hz)—THORLABS APD410C.

The measuring optical fibre F is terminated with the anti-reflection element EA. State of the art knowledge indicates that to achieve the required match, i.e. −50 dB it is not sufficient to provide a typical open end for the optical fibre—8° angled physical contact (APC) end: "Reliability of Optical Fibres and Components: Final Report of COST 246" Tarja Volotinen et. al. Reflection coefficients obtained with APC are too high and, furthermore, open APC connectors tend to corrode and degenerate during use. It is possible to obtain a value better than −50 dB by cleaving the measuring optical fibre F itself, but over time this value will deteriorate as a result of degradation of the surface over time or contamination thereof. The anti-reflection element EA in this embodiment was obtained by splicing to the end of the measuring optical fibre F a section of optical fibre without a core-a 1 mm long glass cylinder. This section was then cleaved at an angle of 8° to obtain a reflection coefficient of −60 dB. If, additionally, the end of the measuring optical fibre prepared in this manner is immersed in an index matching liquid, which has a refractive index between the refractive index of glass and one, a −80 dB match is obtained. The disadvantage of using a matching liquid is that the end of the measuring optical fibre F must be additionally protected.

The −60 dB match can be achieved by immersing the 8° cleaved end of the measuring optical fibre F in the index matching liquid even without an additional optical fibre section without a core.

The best results were achieved with a matching of −80 dB, completely satisfactory with −60 dB, but with a matching of −50 dB measurement can also be performed.

The control signal for the system for generating radiation Z is provided by the processing unit UP. The detector D is connected to the processing unit UP via an 8-bit analogue-to-digital converter ADC with a bandwidth corresponding to that of the detector D or wider. PICOSCOPE 2205A was used as the analogue-to-digital converter (ADC). Higher calculation accuracy was achieved with the 12-bit PICO-TECH 4224 converter. Further improvement was observed with the 16-bit PICOTECH 5243D converter.

The detector D is connected to the system for generating radiation Z via the optical path T. The optical path T contains a system of components operating as the interferometer I, including the multi-port element EW, the mode excitation system P, and the connected thereto measuring optical fibre F which is sensitive to the environment and more specifically to variable physical quantities and parameters in the environment. In particular, these include temperature, pressure, strain, radiation.

It has already been noted in the state of the art that some parameters such as temperature and pressure affect the same quantity-effective refractive index-which makes it more difficult or impossible to carry out measurements when more than one parameter changes. In some applications three or four parameters may change.

The measuring optical fibre F is adapted to guide modes with different effective refractive indices, which are sensitive to individual parameters in different ways. An example of such measuring optical fibre F is a PANDA type optical fibre ("PANDA" refers to the resemblance of the fiber's cross-section to the face of a panda, and is also an acronym for "Polarization-maintaining AND Absorption-reducing"), in which two different polarization modes can be guided.

In the measuring path of the device according to the invention, there is the mode excitation system P controlled from the processing unit UP, adapted to sequentially excite in the measuring optical fibre F the first polarization mode during the first measurement and the second polarization mode during the second measurement. These modes have different effective refractive indices. The mode excitation system P is implemented as a polarization rotator or polarization switch.

Using the detector D, the light signal resulting from Rayleigh scattering in the measuring optical fibre F is recorded. The intensity of the scattered signal depends on temperature and stress, as well as on the polarization mode subject to scattering. Due to the low intensity of Rayleigh scattering, the measuring optical fibre F must be terminated with the anti-reflection element EA providing a reflection of less than or equal to −50 dB. This results in a level of noise that is small enough to be able to formulate and solve SEQ a system of equations binding the parameters to be measured, on the basis of the effective refractive index values determined, despite the measurement error.

Figure 1B:
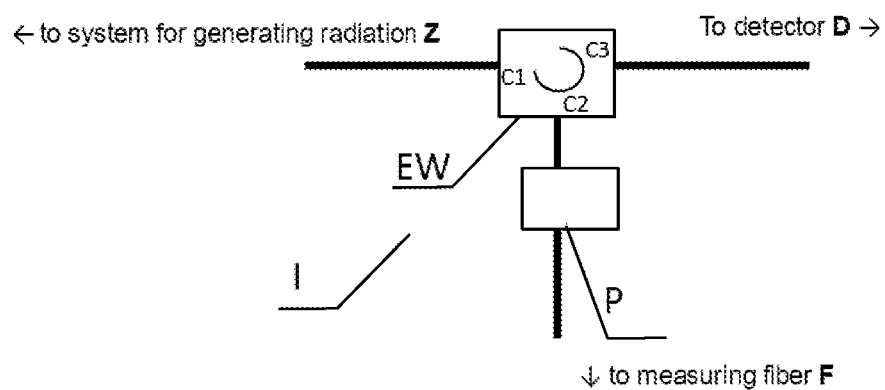
FIG. 1B shows an example of multi-port element (imperfect circulator having ports C1, C2, C3) used in the interferometer in this embodiment of the invention.

In the embodiment, the operation of the interferometer I using multi-port element EW as shown in FIG. 1B is based on the fact that the multi-port element EW is a non-perfect circulator enclosed with the mode excitation system P in a separate housing having a connector for the measuring optical fibre F and connectors for single-core and single-mode optical fibres OF1. The circulator system with the measuring optical fibre F is the interferometer I, in which one arm is a measuring optical fibre F together with the anti-reflection element EA, and the other arm is an imperfectly isolated connection of the input port C1 and the output port C3 of the circulator. The signal in the perfect circulator is isolated between the input port C1 and the output port C3. In typical circulators, the isolation is at a level of 50 dB. Such a value enables the observation of interference of the measurement signal passed by the transmission S21 and S32 of the circulator with a crosstalk signal attenuated by the isolation S31 of the circulator. Thus, the crosstalk signal is a reference signal in relation to the measurement signal returning from the measuring optical fibre F from the port C2. These signals are subject to interference after the port C3 in the optical fibre OF1 that guides the signal to the detector D.

Figure 1C:
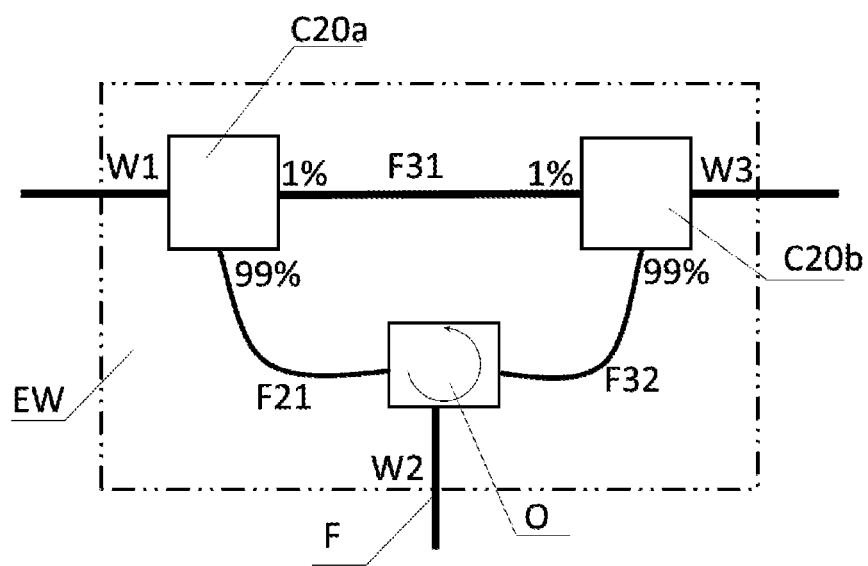
FIG. 1C shows alternative applicable multi-port element comprising two-20 dB couplers and circulator.

Naturally, the interferometer I configuration and a reference signal interfering with the measurement signal can also be obtained by using the multi-port element EW with a larger number of ports and, if required to provide reference signal, attaching to one of them a reference arm, i.e. a section of measuring optical fibre F terminated with the anti-reflection element EA attenuating the reflected signals by at least 40 dB. Moreover, a multi-port element EW can be realized not only as a circulator, but also another element with directional properties, e.g. a coupler or splitter or even a system of several such elements. An example using two 99 to 1 couplers C20a, C20b connected via optical fibre F31 and each having one arm connected to another and second arms connected via two of the three ports of circulator having the third port adapted for connecting with measuring optical fibre F is shown in FIG. 1C. A first port W1 of the multi-port element EW is connected with a first port of the coupler C20a. A second port of the coupler C20a is connected with a first port of the coupler C20b via optical fibre F31. The coupler C20b has a second port connected to a third port W3 of the multi-port element EW. A third port of the coupler C20a is connected with a first port of the circulator O via optical fibre F21. A second port of the circulator O is connected with the third port of the coupler C20b. Remaining third port of the circulator O is connected to the second port W2 of the multi-port element EW, to which the measuring fibre F is connected. The length of optical fibre F31 is shorter than sum of the lengths of the optical fibres F21 and F32 which is expressed as |F31|<|F21|+|F32|. If that requirement won't be fulfilled than part of a measurement information will be lost. Use of a single, imperfect circulator is simpler and gives lower risk of manufacturing errors, however using off-the-shelf couplers and circulator allows for better control over the parameters and reasonable repeatability by reducing inter-sample variability which contributes to better use of detector dynamics. Alternatively, additional couplers can be used and a reference interferometer with more arms can be constructed. Such solutions are quite commonly used in OFDR techniques.

By placing the multi-port element EW and the mode excitation system P in a separate housing, this housing can be connected by a long optical fibres OF1 to a separate housing containing the system for generating radiation Z, the detector D, and the processing unit UP. As a consequence, these sensitive parts of the measuring device can be placed far away from the location where the quantity to be measured is to be tested. This ensures that they are not exposed to damage and only the interferometer I with the multi-port element EW, the mode excitation system P, and the measuring optical fibre F is located in the area subject to environmental exposure. Such a solution is particularly advantageous in measurement tasks in which the measuring optical fibre F is exposed to changes of more than one parameter. In such situations, there is a significant increase in the risk that any of the variable parameters such as temperature, vibration, radiation, or magnetic field will change in the range exceeding beyond the normal operating conditions of sensitive components such as the laser of the system for generating radiation, the detector D, or the processing unit UP. The systems for tuning non linearity compensation of the tuneable radiation generators used in OFDR techniques are sensitive to mechanical vibrations and other parameters that can be measured-particularly temperature. Allowing the non linearity compensation system to be exposed to the measured parameter causes the calibration signal and the interference signal to be compensated in different ways, which distorts the cross correlation result. The phenomena described lead to an increase in measurement error, which can be avoided by placing a separate housing with the interferometer I and the measuring optical fibre F in the location subject to environmental exposure.

An alternative to the optical fibre with two different polarization modes described above is to use as the measuring optical fibre F a multi-core optical fibre with at least two single-mode cores of different diameters and/or different doping. This way, the system is implemented in such a way that the mode with the first effective refractive index Mn1, constituting a first-order mode, is propagated in the first core 31, and the mode with the second effective refractive index Mn2, also constituting a first order mode, is propagated in the second core 32.

Controlled from the processing unit UP, the mode excitation system P is adapted to sequentially excite in the measuring optical fibre F the mode propagating in the first core 31 at the first measurement, and the mode propagating in the second core 32 at the second measurement.

Figure 2:
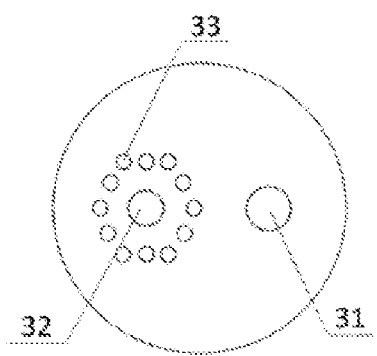
FIG. 2 shows a schematic example of a multi-core measuring optical fibre.
Figure 3:
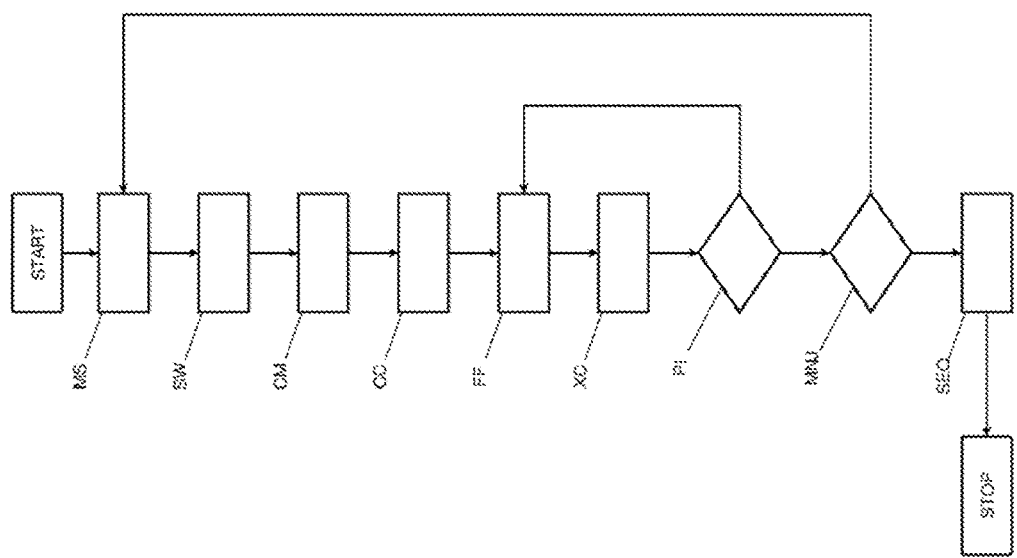
FIG. 3 depicts a flowchart for the embodiment of the method according to the invention.

Because the cores of the measuring optical fibre F have different profiles of the refractive index, the modes propagating in them differ in the effective refractive index and the sensitivity to the parameters to be measured. The cross-section of a dual-core optical fibre meeting the aforementioned requirements is schematically shown in FIG. 2. The first core 31 has a diameter of 4.5 μm and a numerical aperture of 0.1, and the second core 32 has a diameter of 3 μm and a numerical aperture of 0.2. The second core 32 is additionally surrounded by air holes 33, which reduces crosstalk between cores 31 and 32. In this embodiment, the air holes 33 have a diameter of 6 μm and the pitch defined as the distance between the centres of adjacent air holes 33 is 20 μm. Persons skilled in the art can easily propose other configurations and sizes of air holes 33, selecting them to ensure the desired level of crosstalk between cores 31 and 32, for example, using guidelines presented in the following article: Lukasz Szostkiewicz, Marek Napierala, Anna Ziolowicz, Anna Pytel, Tadeusz Tenderenda, and Tomasz Nasilowski, "Cross talk analysis in multicore optical fibers by supermode theory," Opt. Lett. 41, 3759-3762 (2016). The best results were obtained by making a design assumption to maintain the coupling between cores at −50 dB or less, but measurements can be made even with coupling at −20 dB.

To clarify the nomenclature, the coupling between the m-th core and the n-th core of a K-core measuring optical fibre F is expressed in decibels, absolute value of the scattering matrix coefficient Sm1n2 of this measuring optical fibre F treated as a 2K port multi port component in which each end of each core is treated as a port. As a result, ports m1 and m2 are connected by the m-th core and ports n1 and n2 by the n-th core.

The mode excitation system P is implemented as an optical fibre switch and fan-in/fan-out component. An embodiment of a device for independent addressing of cores in the microstructural multi-core fibre, which can be used as fan-in/fan-out, was disclosed in the publication of the international patent application No. WO2015088365A2.

The anti-reflection element EA was obtained by splicing to the end of the measuring optical fibre F a section of optical fibre without a core—a 1 mm long glass cylinder. This section was then cleaved at an 8° angle and immersed in an index matching liquid, resulting in a matching level of −80 dB. The anti-reflection element EA can be provided at the end of the measuring fibre, but also can take a form of an attenuator, separator or other device for suppressing reflected signal, provided in the middle of the one long optical fibre. Naturally then only the part of said optical fibre would provide measurement signal and only this part can be considered measuring optical fibre. It is also possible to use very long measurement optical fibre and use only a segment of which and taking benefit of the fact that signal reflected from the remote end is attenuated by normal propagation attenuation.

The measuring optical fibre F can also be realized as a multi-mode optical fibre in which at least one higher order mode is excited. For example, it could be a single core optical fibre, in which the mode excitation system P excites the LP01 mode in the measuring optical fibre F during the first measurement, and the LP11 mode during the second measurement. These modes have different effective refractive indices. The mode excitation system P is therefore implemented as a spatial phase modulator PMF or a series connection of an optical fibre optic switch with a mode multiplexer.

The use of an additional synchronization system (not shown in the figures) connected to the system for generating radiation Z by an optical path T and having its output connected to the processing unit UP allows synchronization to be performed. Such systems are known in the state of the art and used in measuring techniques.

When performing measurement using the device according to the invention, with the mode excitation system P for modes, in the first selection step MS the measuring mode is selected, i.e., the mode which in the following step of the sweep SW will be excited in the measuring optical fibre F.

In the next step of the sweep SW, a light signal is generated by means of the system for generating radiation Z tuned using a signal from the processing unit UP. The result of the interference of the signal scattered (Rayleigh scattering) in the measuring optical fibre F with the reference signal is detected by the detector D. This is how the interference signal is obtained.

In the following steps, a correction of the tuning non-linearity of the system for generating radiation Z is carried out by the synchronization system (not shown in the figures). First, this CM tuning non-linearity of the system for generating radiation Z is determined by means of an additional system (not shown in the figures). Then the correction CC of interference signal samples recorded with the detector D takes place, so as to compensate for the designated non linearity of tuning. These two steps would not be necessary if the system for generating radiation Z with linear tuning was used. By using these steps, as a result of sampling in the detector D, samples collected for equal changes of the laser frequency are obtained. This allows for the correct identification of the point on the measuring optical fibre F where certain frequency components of the signal, which is the result of interference of the measurement signal with the reference signal, have been scattered.

The detection and correction of the tuning non-linearity of the system for generating radiation Z are techniques known in the field of optical reflectometry. They require the use of additional (known) systems which, for the sake of simplicity, are not illustrated in the figure attached to this description. An embodiment of a method of non-linearity correction is disclosed in subsection 3.3.1. NUFFT of the publication by Ding, Zhenyang et al. "Distributed Optical Fiber Sensors Based on Optical Frequency Domain Reflectometry: A review." Sensors (Basel, Switzerland) 18 (2018): 104-127, and in articles by Ahn Tae-Jung et al. "Suppression of nonlinear frequency sweep in an optical frequency-domain reflectometer by use of Hilbert transformation" and Yuksel et al. "Analysis and suppression of nonlinear frequency modulation in an optical frequency-domain reflectometer."

During the frequency filtration step FF for each point $P_i$ of the measuring optical fibre F where the parameters are to be determined, a band-pass filter with a centre frequency determined from the position of the Pi point in the measuring optical fibre F is constructed, starting with the multi port element EW, according to the following equation:

$$f_i = 2 \cdot L_i \cdot n_j \cdot s/c$$

where $f_i$ is the centre frequency of the filter, $L_i$ is the distance of point $P_i$ for which the filter is determined from the multi-port element EW, $n_j$ is the effective group refractive index of the j-th measured mode, s is the source tuning rate, and c is the speed of light in a vacuum.

In the simplest case, when measuring temperature and strain, it is enough to use two measurement modes j=1 and j=2. Measuring more parameters requires the use of additional modes. By using a number of measurement modes greater than the number of measured parameters, measurement error can be reduced.

The band-pass filter used is centred at a given position in the measuring optical fibre F and its bandwidth corresponds to the required measurement resolution. For example, for a measurement resolution of 10 cm and a source tuning rate of 0.15 nm/s, the filter width is 20 Hz.

For each measurement point $P_i$, the signal resulting from the band-pass filtration FF of the interference signal during measurement using the j-th mode is compared to the calibration signal obtained for the same mode, subjected to the same filtration. The comparison is made at the step of correlation analysis XC by determining the cross-correlation between the interference signal and the calibration signal and shift of the maximum of this cross-correlation in relation to zero. The cross-correlation is determined separately for the subsequent selected modes. For the j-th mode, the pattern takes the following general form:

$$XC_j(\Lambda) = \int_{-\infty}^{\infty} S_{M,j}(\lambda) \cdot S_{cal,j}(\lambda - \Lambda) d\lambda$$

where:

$XC_j(\Lambda)$ is the cross-correlation for the j-th mode;

$S_{M,j}(\lambda)$ is the interference signal determined during the measurement using the j-th mode;

$S_{cal,j}(\Lambda)$ is the calibration signal determined for the j-th mode;

$\lambda$ is the wavelength;

$\Lambda$ is the shift in wavelength.

Based on the maximum cross-correlation shift for each point $P_i$—testing the loop end condition PI, and for each mode—testing the condition for the mode loop end MNJ—changes—$\Delta n_{eff_{i,j}}$—of effective refractive index are determined according to the following equation:

$$\Delta n_{eff_{i,j}} = n_{eff} \cdot \frac{\Delta \Lambda_{i,j}}{\lambda_0}$$

where $\Delta n_{eff_{i,j}}$ is a change of the effective refractive index under with respect to value obtained in the calibration measurement conditions for the i-th measurement point and the j-th mode, $\Delta \Lambda_{i,j}$, is the shift of the cross-correlation maximum determined during the measurement for point $P_i$ when the j-th mode is excited, $\lambda_0$ is the central measurement wavelength. The value $n_{eff}$ is read from the tables for standard conditions (temperature, pressure, stress, radiation) under which the calibration measurement was performed. Alternatively, it is possible to determine this value using computer simulations.

As a result, for the simultaneous measurement of two parameters, i.e. temperature and strain, a system of equations is obtained:

$$\begin{cases} \Delta n_{eff1} = \left(\frac{dn}{dT}\right)_1 \Delta T + \left(\frac{dn}{d\varepsilon}\right)_1 \Delta \varepsilon \quad \mod j = 1 \\ \Delta n_{eff2} = \left(\frac{dn}{dT}\right)_2 \Delta T + \left(\frac{dn}{d\varepsilon}\right)_2 \Delta \varepsilon \quad \mod j = 2 \end{cases}$$

where particular quantities mean:

$\Delta n_{eff_j}$ is the measured change in the effective refractive index of the j-th mode;

$$\left(\frac{dn}{dT}\right)_j$$

is the coefficient determined in the calibration, representing the change in the effective refractive index of the j-th mode influenced by temperature;

$$\left(\frac{dn}{d\varepsilon}\right)_j$$

is the coefficient determined in the calibration, representing the change in the effective refractive index of the j-th mode influenced by strain;

$\Delta T$ is the temperature change; and $\Delta \varepsilon$ is the relative change in length representing strain.

In a correctly calibrated measurement system, this system is a system of two equations with two variables, solvable when the determinant is different from 0:

$$\left(\frac{dn}{dT}\right)_2 \left(\frac{dn}{d\varepsilon}\right)_1 - \left(\frac{dn}{dT}\right)_1 \left(\frac{dn}{d\varepsilon}\right)_2 \neq 0$$

The solution of the equation system SEQ allows measurands to be retrieved. Naturally it can also be used to measure just one measurand and only eliminate an impact of the other.

In embodiments in which more parameters are set and more modes are used—to be precise: J-parameters and J-modes having different effective refractive indices and reacting differently to environmental factors, which represent the parameters to be measured (for example: strain, pressure, temperature, radiation), the condition for solving the system is a non zero determinant of the measurement matrix $M_{p[J \times J]}$.

$$M_p = \begin{bmatrix} \frac{dn_1}{dp_1} & \cdots & \frac{dn_j}{dp_1} \\ \vdots & \ddots & \vdots \\ \frac{dn_1}{dp_k} & \cdots & \frac{dn_j}{dp_k} \end{bmatrix} \text{ where } \frac{dn_1}{dp_k}$$

is a change in the effective refractive index of the j-th mode under the influence of the k-th physical quantity. While $j \in \{1 \ldots J\}$ and $k \in \{1 \ldots J\}$.

In embodiments where more parameters are determined (K-parameters) and more modes are used (J-modes), having different effective refractive indices and responding differently to environmental factors representing the parameters to be measured, the measurement matrix is not a square matrix. The condition for the system's solvability is $J \geq K$ and a non-zero determinant of the matrix that is the product of the measurement matrix and its transposition $$M_{p[K \times J]} \times M^T_{p[K \times J]}$$

$$M_{p[K \times J]} = \begin{bmatrix} \frac{dn_1}{dp_1} & \cdots & \frac{dn_J}{dp_1} \\ \vdots & \ddots & \vdots \\ \frac{dn_1}{dp_K} & \cdots & \frac{dn_J}{dp_K} \end{bmatrix}$$

where $$\frac{dn_j}{dp_K}$$

is a change in the effective refractive index of the j-th mode under the influence of the k-th physical quantity, while $j \in \{1 \ldots J\}$ and $k \in \{1 \ldots K\}$, and $J > K$.

The measure of the quality of a measuring optical fibre F is the value of the determinant of matrix $M_p \times M_p^T$, where element $$\frac{dn_j}{dp_k}$$

is a change of the effective refractive index of the j-th mode under the influence of the k-th parameter. Maximizing the determinant of the presented matrix minimises the error of distinguishing individual parameters, resulting from the numerical propagation of the measurement error of determining the change in the effective refractive index of individual modes.

If measuring optical fibre F is subjected to exposition on changes of two environmental factor affecting propagation of light and measured with two parameters use of two modes is enough to determine any of these parameters or both of them by solving entirely or partially the system of equations. It happens quite often that measuring optical fibre F is exposed to simultaneous changes of temperature and changes of strain while impact of other environmental factors and parameters on propagation of light is negligible.

To distinguish the impact of two parameters it is easy to use birefringent measuring optical fibre F such as panda or bow-tie or elliptical-clad, and induce two different polarization modes therein. An advantage of use of birefringent measuring optical fibre F is ease of generation of two modes simultaneously.

For effective use of two polarization modes, it is required for the whole system to keep polarization. Therefore, all fibres and elements are polarization maintaining. In such system use of birefringent measuring optical fibre F allows simple and efficient realization of mode excitation system P.

For excitation of two modes, it is enough to rotate polarization. Perfect angle of rotation is 45 degrees it results in excitation two polarization modes in birefringent measurement fibre F and both modes have substantially the same power. Consequently, measurement signals have substantially the same power and system of equations that needs to be solved to retrieve parameter(s) has good numerical conditioning.

Mode excitation system P can therefore be realized as deliberately slanted splice in polarization maintaining system. The best splicing angle is 45° degrees but angles within a range of 30° to 60° are still reasonable. Experiments shown that even small angles of rotations 5° to 85° can contribute to two-mode measurements although one of the polarization modes is significantly weaker. If angle of rotation is lower than 5° then weaker mode is not useful anymore. Modern splicers provide 0.5° accuracy.

Therefore, connection joint e.g., rotated splice can constitute the mode excitation system P as it provides an effect that both fast axis and slow axis modes are excited in the measuring optical fibre F.

Figure 6:
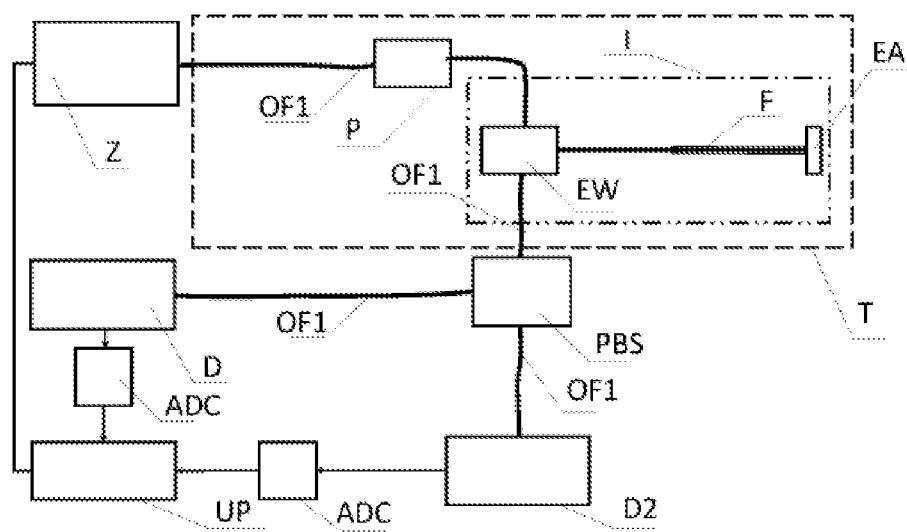
FIG. 6 shows a block diagram of an embodiment with simple mode excitation system cooperating with birefringent measuring optical fibre.

Additional advantage of such configuration is that it is easy to speed up measurement by using additional detector D2. Both detectors D and D2 are connected to optical path T via polarization beam splitter PBS aligned with slow axis and fast axis of the birefringent measuring optical fibre F. An easy way to achieve that is to use slanted splicing between system for generating radiation Z and the optical path T as shown in FIG. 6. In this configuration mode excitation system P is very simple—it is just a connection-splice providing required angle between polarization of the light being fed and the slow and fast axes of the birefringent measuring fibre F. It is enough to excite a first (slow) polarization measuring mode MN1 with a first effective refractive index an a second (fast) measuring mode MN2 with a second effective refractive index.

To distinguish the impact of four different parameters, four modes with different effective refractive indices and sensitivity to parameters, providing good numerical conditioning of matrix MP are needed. The measuring optical fibre F and the mode excitation system P can be used where the measuring optical fibre F has two cores. The first core 31 is designed to incorporate first- and second order modes, and the second core 32 is a birefringent single mode core-two fundamental polarization modes can propagate in it. Four modes with different effective refractive indices can propagate in such an optical fibre.

Figure 7:
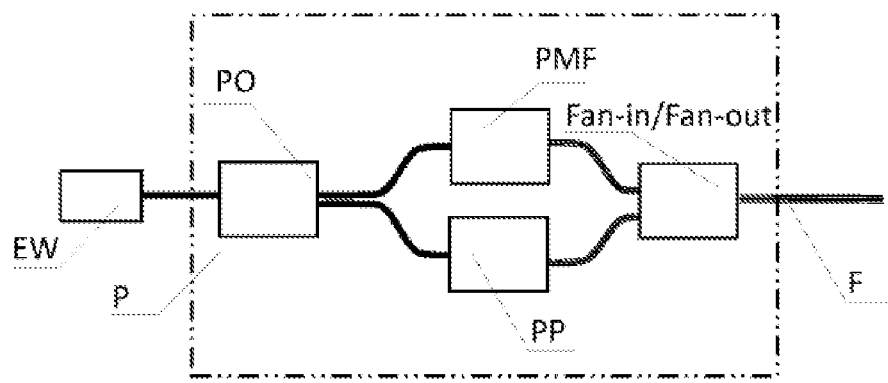
FIG. 7 presents a block diagram of the mode excitation system in the embodiment in which multiple measuring modes of different orders in multiple cores are excited.

The block diagram of the mode excitation system P working with this measuring optical fibre F is shown in FIG. 7. This mode excitation system P consists of a combination of the optical switch PO, the spatial phase modulator PMF, the polarization switch PP, and the Fan-in/Fan-out component. The first output of the optical switch PO is attached to the spatial phase modulator PMF, and the second output is attached to the polarization switch PP. The spatial phase modulator PMF and the polarization switch PP are connected to the Fan-in/Fan-out component. In response to a control signal from the processing unit UP, such a combination allows exciting the selected measurement mode from the four available modes in the measuring optical fibre F.

There is such a configuration of the device according to the invention in which, thanks to the use of multi-core optical fibres, it is possible to avoid the need to switch the mode excitation system P and to excite the individual modes sequentially. Such an embodiment of the invention is presented in the block diagram in FIG. 4A.

As the measuring optical fibre F, a dual-core optical fibre was used, whose cross-section is shown in FIG. 2. Naturally, according to the invention, optical fibres with more cores can be used.

The mode excitation system P is a simple fan-in/fan-out component with one output connected to the multi-port element EW, while the second one is terminated by the anti-reflection element EA ensuring a reflection coefficient of less than or equal to −50 dB. At the opposite end of the measuring optical fibre F, there is a fan-in/fan-out component whose outputs are connected to each other. The result is the loop U which returns the signal coming from the first core 31 to the second core 32, which allows measuring the signal scattered in both cores of the measuring optical fibre F. A good condition for the system of equations is easier to achieve by using the anti-reflection element EA matched to −80 dB.

Figure 4A:
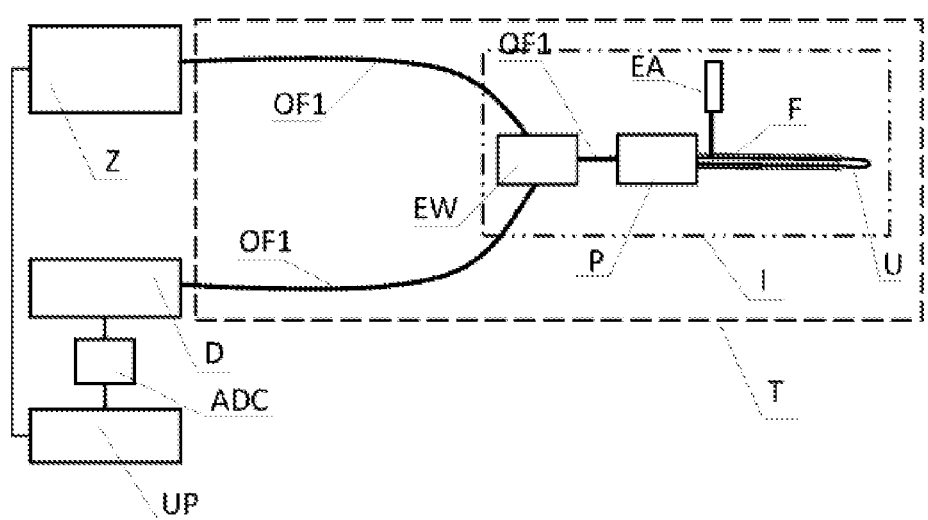
FIG. 4A shows a block diagram of the device in an alternative embodiment of the invention.
Figure 4B:
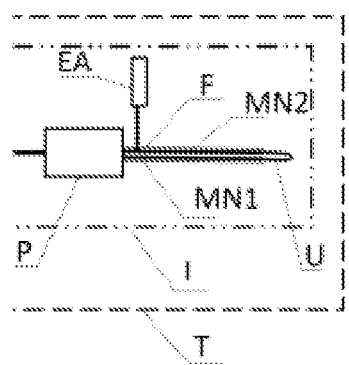
FIG. 4B shows the interferometer measurement arm.
Figure 5:
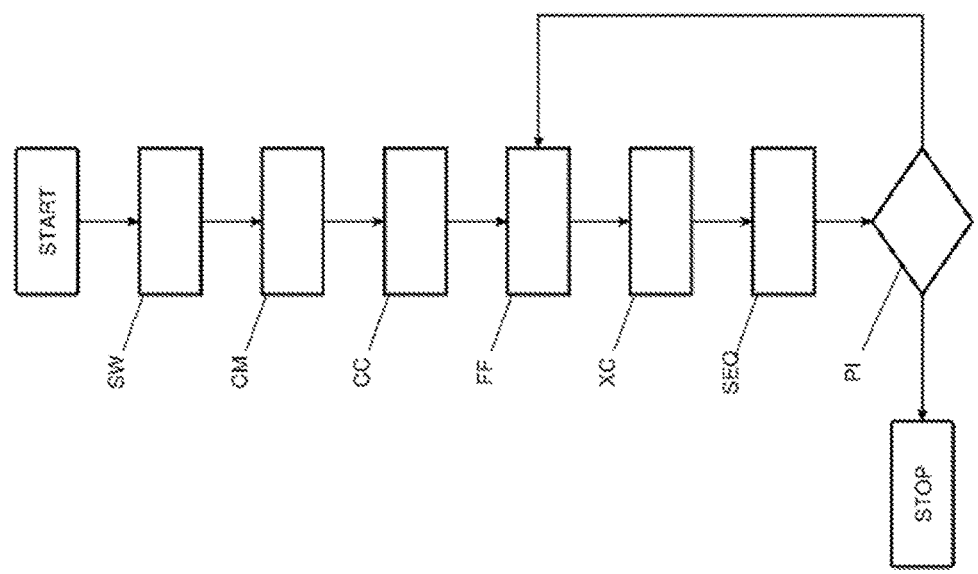
FIG. 5 shows the flowchart for the method of measuring parameters using the device according to this alternative embodiment of the invention.

By making a measurement with the device according to the embodiment of the invention-block diagram of which is shown in FIG. 4A-two measurement modes are excited at the same time in the measuring optical fibre F, initially exciting only one core using the mode excitation system P. As shown schematically in FIG. 4B the first measuring mode MN1 is excited in the first core 31 and the second measuring mode MN2 in the second core 32 is excited by the propagation of light through the loop U, connecting the two cores at the opposite end of the measuring optical fibre F. As a result, the first mode with the first effective refractive index is propagated from the mode excitation system P to the loop U, and the second measuring mode MN2 with the second refractive index is propagated from the loop U to the anti-reflection element EA.

During the sweep step SW, a light signal is generated using the system for generating radiation Z tuned by a signal from the processing unit UP. The result of the interference of the signal scattered (Rayleigh scattering) in the measuring optical fibre F with the reference signal is detected by the detector D.

After determining CM the non-linearity of source tuning and correction CC, samples collected for equal changes of the laser frequency are obtained. Non-linearity correction enables correct identification of the exact point in the measuring optical fibre F where certain frequency components of the measurement signal, have been scattered to subsequently interfere with the reference signal at the detector D.

The reference signal is a result of the non-perfect isolation of the directional multi-port element EW. Alternatively, this signal can be provided by using a coupler or splitter and the entire reference arm or even a more extensive section of the optical path T.

During the frequency filtration step FF for each measurement point $P_i$ of the measuring optical fibre F where the parameters are to be determined, two band-pass filters with centre frequencies determined from position $L_i$ of point $P_i$ in the measuring optical fibre F is constructed, starting with the multi-port element EW, according to the following equation:

$$\begin{cases} f_{i,1} = 2 \cdot L_i \cdot n_2 \cdot s/c, & \mod j = 1 \\ f_{i,2} = 2 \cdot (2 \cdot L_{tot} - L_i + \Delta_U) \cdot n_2 \cdot s/c, & \mod j = 2 \end{cases}$$

where $f_{i,j}$ is the centre frequency of the filter designed to measure the i-th point on the j-th mode, Li is the distance of point Pi for which the filter is determined from the multi-port element EW, $L_{tot}$ means the total length of the measuring optical fibre F, $n_j$ is the effective group refractive index of the j-th measurement mode, s is the source tuning rate, $\Delta_U$ is the optical length of the loop U, and c is the speed of light in a vacuum. Filter bands are selected as described above. In this embodiment, the number of measurement points being indexed is twice as high as the number of actual measurement points along the measuring optical fibre F. It is due to the fact that using two cores for measurement has that consequence that at each physical point in the measuring optical fibre F, the signal runs twice in single measurement—each time in a different core.

For each measurement point $P_i$, signals resulting from the band-pass filtration FF by filters selected for this point are compared to the calibration signal subjected to the same filtering. The comparison is made at the step of correlation analysis XC by determining, as a function of wavelength, the measure of similarity of two signals represented in the frequency domain. The first signal is the result of the filtration FF of the signal. The second signal is the result of filtering with the same calibration signal filter. Thus, the response of the measuring optical fibre F is compared in a specific band for the measurement conditions with the response to the calibration condition. Since the filtration corresponds to the selection of a specific point (or section) $P_i$ along the length of the measuring optical fibre F, the result of the comparison represents a change resulting from fluctuations in the parameters to be measured. A good measure of similarity as a function of wavelength is the cross-correlation function. The shift $\Delta\Lambda_i$ of its maximum in relation to zero is a measure of the deviation of parameters from the calibration conditions.

Based on the maximum cross-correlation shift between the measurement signal and the calibration signal subjected to the band-pass filtering at the centre frequency $f_i$ the change in the effective index is determined:

$$\Delta n_{eff_i} = n_{eff} * \frac{\Delta\Lambda_i}{\lambda_0}$$

where:

$n_{eff}$ is the effective refractive index under the calibration measurement conditions;

$\Delta\Lambda_i$ is the shift of the cross-correlation maximum determined during measurements for point $P_i$;

$\lambda_0$ is the central measurement wavelength.

The value $n_{eff}$ is read from the tables for standard conditions (temperature, pressure, stress, radiation) under which the calibration measurement was performed. Alternatively, it is possible to determine this value using computer simulations.

As a result, for the simultaneous measurement of two parameters, temperature and strain, a system of equations is obtained for each point $P_i$, the same as when using the device according to the previous embodiment of the invention. This system is solved by SEQ to recreate the measurand. The condition of the equation system depends, among other things, on the detector D used and the proportion between the levels of the measurement and reference signals, as well as on the difference in sensitivity of individual modes to individual parameters.

Steps FF, XC and SEQ are performed in a loop for subsequent measurement points until the condition PI—of exhausting the pool of points—is met.

There are known numerical alternatives to using cross-correlation as a measure of signal similarity as a function of wavelength, providing a measure of signal similarity and a shift corresponding to the maximum of this similarity. They are presented, for example, in the article by L. Zhang, L. D. Costa, Z. Yang, M. A. Soto, M. Gonzalez-Herráez and L. Thévenaz, "Analysis and Reduction of Large Errors in Rayleigh-Based Distributed Sensor," in *Journal of Lightwave Technology*, vol. 37, no. 18, pp. 4710-4719, 15 Sep. 15, 2019, which disclosed a solution in which the measure of similarity is determined by shifting two signals in relation to each other and calculating their distance as a function of shift.

Measurements made according to the method according to the invention are preceded by a calibration in which the measuring optical fibre F is placed in an environment with controlled parameters—e.g. in an environmental chamber. When performing a calibration measurement, a set of calibration signals is recorded, i.e. signals from the detector D obtained for all measurement modes. With large ranges of changes in the measured parameters, it is sensible to update calibration signals to the current parameter values. In this way, a moving measurement range is achieved. A disadvantage of this solution is the accumulation of error during the measurement. When using systems for generating radiation Z with non-perfect linearity, the calibration signal is also subject to non-linearity correction.

The method according to the invention can be done automatically. The processing unit UP is then a digital machine with memory that executes a computer program permanently or temporarily stored in that memory. Industrial computers and FPGA systems work well. Microcomputers or dedicated ASIC units can also be used.

The use of a multi-core optical fibre with cores connected at the end with a loop U as the measuring optical fibre F and the application of the method described above allows measuring the parameters with one sweep and the simultaneous measurement of more modes thanks to the fact that the measurement signal propagates repeatedly along the length of the measuring optical fibre F in different cores and thus in different modes. It is very convenient. A disadvantage of such a solution is that the maximum length of the measuring optical fibre F allowing the measurement is shortened twice because the use of the loop U makes the optical path T of the measurement signal about twice as long as the physical length of the measuring optical fibre F.

Based on the presented embodiments, those skilled in art will easily notice that the scope of the invention includes solutions in which a larger number of cores are used in a similar manner, shortening the maximum length of the measuring optical fibre F 3, 4 and more times. This allows measuring more parameters in one sweep or obtaining a particular system of equations while maintaining the same number of parameters, and consequently reducing error.

Person skilled in the art will notice that by placing the multi-port element EW and the mode excitation system P in a separate housing, this housing can be connected by long optical fibres OF1 to a separate housing containing the system for generating radiation Z, the detector D, and the processing unit UP. As a consequence, these sensitive parts of the measuring device can be placed away from the location where the quantity to be measured is tested. This ensures that these devices are not exposed to damage and only the interferometer I with the multi-port element EW, the mode excitation system P, and the measuring optical fibre F is located in the area subject to environmental exposure. Such a solution is particularly advantageous in measurement tasks where the measuring optical fibre F is exposed to changes of more than one parameter. In such situations, there is a significant increase in the risk that any of the variable parameters such as temperature, vibration, radiation, or magnetic field will change beyond the normal operating conditions of sensitive components such as the laser of the system for generating radiation, the detector D, or the processing unit UP. In addition, the systems for compensating for the tuning non linearity of the tuneable radiation generators used in OFDR techniques are sensitive to mechanical vibrations and other parameters that can be measured-particularly temperature. Allowing the non linearity compensation system to be exposed to the measured parameter causes the calibration signal and the interference signal to be compensated in different ways, which distorts the cross correlation result. The phenomena described lead to an increase in measurement error, which can be avoided by placing a separate housing with the interferometer I and the measuring optical fibre F in the location subject to environmental exposure. Thus, providing a separate connector equipped housing for the multi-port element EW and the mode excitation system P statistically translates into improved measurement accuracy, particularly when measuring multiple measurands simultaneously.

Based on the presented embodiments, those skilled in art will also easily notice that the scope of the invention includes also hybrid solutions in which the measurement signal propagates along a measuring optical fibre F multiple times in one sweep, and thus the measurement is performed using more than one mode while simultaneously switching the mode excitation system P in subsequent sweeps, which measures subsequent modes—e.g., higher-order modes or polarization modes. This allows the utilization of the advantages of both configurations of the devices according to the invention discussed above.

Those skilled in the art of OFDR techniques will easily apply detection solutions known in the state of the art, such as partial Fourier transforms, signal gating, or measuring dynamic changes, thus obtaining solutions within the scope of the invention defined by the attached claims.

The claims appended hereto are meant to cover all modifications and changes within the scope and spirit of the present invention.

What is claimed is:

1. A method of determining a parameter at a measurement point via an optical fibre based measurement system having a measuring optical fibre (F), in which, by means of Optical Frequency Domain Reflectometry, an interference signal is recorded and analysed, which is a result of an interference of a measurement signal with a reference signal, the measurement signal being obtained as a result of Rayleigh scattering in a structure of the measuring optical fibre (F), and during a measurement, a system for generating radiation (Z) cyclically sweeps (SW) a predefined range of wavelengths at least 0.2 nm wide at a rate of at least 0.15 nm/s, and with said radiation excites in the measuring optical fibre (F) at least two measuring modes with different effective refractive indices and different sensitivity to environmental parameters, to which the measuring optical fibre (F) is exposed, the method comprising:

filtering the interference signal by frequency filtration (FF) in which, for each of the at least two measuring modes, there is applied at least one band-pass filter matched to a position of a measurement point along the measuring optical fibre (F);

determining a measure of similarity as a function of shift in a wavelength domain between the interference signal after the frequency filtration (FF) and a calibration signal after frequency filtration with the same at least one band-pass filter;

determining a change of effective refractive index based on a wavelength value corresponding to a maximum of similarity, for each of said at least two measuring modes having different effective refractive indices, to obtain a system of equations from which a measured parameter is determined during a determination step (SEQ).

2. The method of claim 1, further including correcting samples of the interference signal recorded using a detector (D) and samples of the calibration signal before the frequency filtration (FF), with respect to a tuning non-linearity of the system for generating radiation (Z).

3. The method of claim 1, wherein at least three measuring modes with different effective refractive indices are applied.

4. The method according to claim 1, wherein more measurement measuring modes are used than parameters being determined.

5. The method according to claim 1, wherein the at least two measuring modes are excited by subsequently selecting (MS) them by switching the mode excitation system (P) with a signal from the processing unit (UP).

6. The method according to claim 1, wherein a multi-core measuring optical fibre (F) having two cores is used and the cores are connected by a loop (U), and within measuring optical fibre (F) at least two measuring modes are excited simultaneously during one sweep.

7. A computer program product adapted to be stored in the memory of a processing unit (UP) of a system, the system including an optical fibre based measurement system having a measuring optical fibre (F), in which, by means of Optical Frequency Domain Reflectometry, an interference signal is recorded and analysed, which is a result of an interference of a measurement signal with a reference signal, the measurement signal being obtained as a result of Rayleigh scattering in a structure of the measuring optical fibre (F), and during a measurement, a system for generating radiation (Z) cyclically sweeps (SW) a predefined range of wavelengths at least 0.2 nm wide at a rate of at least 0.15 nm/s, and with said radiation excites in the measuring optical fibre (F) at least two measuring modes with different effective refractive indices and different sensitivity to environmental parameters, to which the measuring optical fibre (F) is exposed, the computer program product comprising:
  a non-volatile machine readable storage medium;
  instruction code stored in the non-volatile machine readable storage medium which, when executed by the processing unit (UP), causes the system to:
  filter the interference signal by frequency filtration (FF) in which, for each of the at least two measuring modes, there is applied at least one band-pass filter matched to a position of a measurement point along the measuring optical fibre (F);
  determine a measure of similarity as a function of shift in a wavelength domain between the interference signal after the frequency filtration (FF) and a calibration signal after frequency filtration with the same at least one band-pass filter;
  determine a change of effective refractive index based on a wavelength value corresponding to a maximum of similarity, for each of said at least two measuring modes having different effective refractive indices, to obtain a system of equations from which a measured parameter is determined during a determination step (SEQ).

8. The computer program product of claim 7, wherein the instruction code, when executed by the processing unit, causes the system to: before the frequency filtration (FF), samples of the interference signal recorded using a detector (D) and samples of the calibration signal are corrected (CC) with respect to a tuning non-linearity of the system for generating radiation (Z).

9. The computer program product of claim 7, wherein the instruction code, when executed by the processing unit, causes the system to apply at least three measuring modes with different effective refractive indices.

10. The computer program product of claim 7, wherein the instruction code, when executed by the processing unit, causes the system to use more measurement measuring modes than parameters being determined.

11. The computer program product of claim 7, wherein the instruction code, when executed by the processing unit, causes the system to excite the at least two measuring modes by subsequently selecting (MS) them by switching a mode excitation system (P) with a signal from the processing unit (UP).

12. The computer program product of claim 7, wherein a multi-core measuring optical fibre (F) having two cores is used and the cores are connected by a loop (U), and within measuring optical fibre (F) at least two measuring modes are excited simultaneously during one sweep.

* * * * *